United States Patent [19]

Ikeda et al.

[11] Patent Number: 4,681,524

[45] Date of Patent: Jul. 21, 1987

[54] EXTRUSION DEVICE

[75] Inventors: Shigeru Ikeda, Yuki; Naomi Okamura, Kuki, both of Japan

[73] Assignee: Cemedine Co., Ltd., Tokyo, Japan

[21] Appl. No.: 773,548

[22] Filed: Sep. 9, 1985

[30] Foreign Application Priority Data

Sep. 8, 1984 [JP] Japan .................................... 188644

[51] Int. Cl.[4] .............................................. B29C 47/00

[52] U.S. Cl. ................................ 425/376 R; 222/326; 222/341; 222/391; 425/458

[58] Field of Search ............................... 222/325-327, 222/338, 341, 386, 391; 425/376 R, 458, DIG. 5, 87; 74/141.5, 148

[56] References Cited

U.S. PATENT DOCUMENTS

| | | | |
|---|---|---|---|
| 2,732,102 | 1/1956 | Ekins | 222/391 |
| 4,009,804 | 3/1977 | Costa et al. | 222/391 |
| 4,033,484 | 7/1977 | Ornsteen | 222/391 |
| 4,330,070 | 5/1982 | Doubleday | 222/391 |
| 4,356,938 | 11/1982 | Kayser | 222/391 |
| 4,461,407 | 7/1984 | Finnegan | 222/391 |
| 4,572,409 | 2/1986 | Finnegan | 222/327 |

FOREIGN PATENT DOCUMENTS

| | | |
|---|---|---|
| 31013 | 10/1971 | Japan . |
| 11964 | 3/1980 | Japan . |

*Primary Examiner*—Jay H. Woo
*Assistant Examiner*—J. Fortenberry
*Attorney, Agent, or Firm*—Oblon, Fisher, Spivak, McClelland & Maier

[57] ABSTRACT

A push rod is forwarded to extrude viscous material in a tubular container from the nozzle. When the extrusion of viscous material is finished, i.e. stopping the forward operation of the push rod, the push rod is allowed to go back by a force resulted by expansion of air unavoidably contained, in the tubular container thereby absorbing expansion of air so as to prevent unwanted discharge of the viscous material due to an inner pressure of the tubular container.

17 Claims, 11 Drawing Figures

EXTRUSION DEVICE

BACKGROUND OF THE INVENTION

1. Field of the Invention

The present invention relates to an extrusion device for extruding highly viscous material such as an adhesive agent, a gap-filling material, an adhesive gap-filling material, grease and so on from a tubular container to apply it to an object. More particularly, it relates to an extrusion device which prevents undesirable discharge of the viscous material from the nozzle.

2. Description of Prior Art

Caulking guns and grease guns have been known as devices for extruding highly viscous material from a tubular container. For instance, a caulking gun, which is used for filling a gap or a joint portion in panels and building materials for buildings and containers with a highly viscous liquid gap-filling material or an adhesive gap-filling material by extruding it from a tubular container, is disclosed in Japanese Examined Utility Model Publications 31013/1971 and 11964/1980. The caulking gun is constructed in such a manner that a tubular container containing a viscous gap-fitting material is formed integrally with the main body or a cartridge type tubular container is fitted to the main body and a push rod is supported by the main body so as to be slidable along the axial direction of the main body, wherein the gap-filling material in the tubular container is extruded from a nozzle formed at the front end of the tubular container by a piston member attached at the end of a push rod when the push rod is urged in one direction along the axial direction.

A driving unit as means for urging the push rod generally comprises a driving piece formed of a plate-like body in which an opening having a diameter slightly greater than the outer diameter of the push rod is formed, the driving piece being supported by inserting the push rod in the opening so that it is slidable in the axial direction and inclinable with respect to the axial direction of the push rod, a coil spring interposed between the main body of the extrusion device and the driving piece and wound around the outer circumferential part of the push rod so that the driving piece is pushed in the opposite direction opposite the forwarding direction of the push rod, and a lever pivotally supported by the extrusion device main body which pushes an end of the driving piece in the forwarding direction of the push rod when the lever is operated.

The operation of the driving unit is such that when an end of the driving piece is pushed by turning the lever in one direction, inclination of the driving piece is caused with respect to the push rod whereby a circular edge portion of the opening is frictionally engaged with the outer circumference of the push rod. Namely, the push rod is pushed together with the driving piece against the spring action of the coil spring.

The conventional extrusion device is provided with a control means for controlling the push rod. The control means generally comprises a control piece in which a control opening having a diameter slightly greater than the outer diameter of the push rod is formed, the push rod being inserted in the control opening and one end of the control piece being turnably supported by a supporting plate made of a plate-like material projecting from the extrusion device main body, and a coil spring interposed between the main body and the control piece and wound around the outer circumferential surface of the push rod to effect the spring action in the direction opposite the forwarding direction of the push rod. The spring action of the coil spring causes the control piece to turn around a point supported by the supporting plate so that the control piece inclines with respect to the axial direction of the push rod with the result that an circular edge portion of the control opening is frictionally engaged with the outer circumference of the push rod. In this case, when the push rod is forwardly pushed by the driving unit, the push rod is allowed to move because the coil spring is compressed. However, when the push rod is moved in the direction opposite the forwarding direction, the movement is prevented due to the frictional engagement between the control opening and the outer circumferential surface of the push rod. Accordingly, when an operator operates the lever, the push rod is pushed forwardly whereby the gap-filling material is extruded from the nozzle formed at the front end of the tubular container. On the other hand, when the operator stops the operation of the lever, the lever returns to the original position together with the driving piece by the spring action of the coil spring, while the push rod is retained at the forwarding position due to the frictional engagement with the control piece of the control means.

Thus, in the conventional extrusion device, when the forwarding movement of the push rod is once stopped, the push rod is retained at a position of stop by the control means. For instance, after completion of work for filling a gap between a pair of panels, when operation of the driving means is stopped, the push rod is retained at the stopped position. Then, when the driving means is operated for filling a gap in another pair of panels, the gap-filling material in the tubular container is immediately extruded from the nozzle. In this case, however, there has been frequently occurred unwanted discharge of the gap-filling material, namely, the gap-filling material in the tubular container is slowly extruded from the nozzle even though the operation of the driving means is stopped to stop the extrusion of the gap-filling material. The unwanted discharging phenomenon for the gap-filling material remarkably takes place as viscosity of the material is high. The unwanted discharge of the gap-filling material causes contamination of an object to be worked when application of the gap-filling material is stopped due to a trowelling treatment, masking with a tape and so on. There also takes place contamination of a floor surface and devices in the vicinity of the object to be worked when the operator moves another place for working and contamination of clothes of the operator and the operator himself. Further, it causes loss of the gap-filling material. In addition, when the gap-filling material contains organic solvents, there takes place problems of firing and working conditions for laborors.

According to study by the inventors of the present invention, unwanted discharge of the viscous material such as the gap-filling material is caused owing to an inner pressure of the tubular container and viscoelasticity of the viscous material in the case that operation of the driving means is stopped to retain the push rod at a position of stop by means of the control means in the extruding of the viscous material in the tubular container. Further, according to study by the inventors, it has been found that when the viscous material is to be filled in the tubular container, air remains inside the tubular container, especially in the vicinity of the slidable bottom due to viscosity of the material. The air is compressed by the forwarding movement of the push rod. When the movement of the push rod is stopped, expansion of the compressed air and viscosity of the material slowly extrudes it from the nozzle.

In a case that a tubular container is formed integrally with the extrusion device main body, it is unavoidable that air remains in the tubular container when viscous material is sucked or filled in the tubular container from its end portion after viscous material previously filled in the container has been exhausted.

In a case of the extrusion device in which a cartridge type tubular container filled with viscous material is fitted to the extrusion device main body, it is unavoidable that some amount of air remains at a circular edge portion of the slidable bottom and inner wall of the tubular container because the viscous material is filled in the tubular container in a string form due to its viscosity when the viscous material is packed in the container. Accordingly, it is impossible to remove the residual air from the cartridge type tubular container before use of it. Further, it has been found that it takes much time to fill the viscous material in the cartridge type tubular container without leaving air in it and that it is impossible to evacuate air remaining in the cartridge type tubular container for a relatively short time without causing hardening of the viscous material.

SUMMARY OF THE INVENTION

It is an object of the present invention to provide an extrusion device which prevents unwanted discharge of the viscous material when extruding operation is stopped.

The foregoing and the other objects of the present invention have been attained by providing an extrusion device for extruding viscous material which comprises: (a) a main body of the extrusion device adapted to receive a tubular container containing viscous material, the tubular container having a nozzle at the front end and a slidable bottom at the rear end; (b) a push rod supported by the main body so as to be slidable in the axial direction of the main body, so that the viscous material in the tubular container is extruded from the nozzle when the slidable bottom is pushed toward the nozzle by the push rod; (c) a push rod control means comprising a control piece formed of a plate-like material having a control opening of a diameter slightly larger than the outer diameter of the push rod to receive the push rod so as to be slidable in the axial direction of the push rod and a part supported by the main body so as to be inclinable, and a spring member interposed between the control piece and the main body to act on the control piece to be inclined at an angle with respect to the axis of the push rod so that frictional engagement between a circular edge portion of the control opening of the control piece and the outer circumferential surface of the push rod is established, and the frictional engagement is maintained when the push rod is stopped or is moved in the direction opposite the forwarding direction of the push rod; and (d) a pressure releasing means which causes the push rod to move in the direction opposite the forwarding direction.

BRIEF DESCRIPTION OF DRAWING

FIGS. 7 to 9 show a fifth embodiment of the present invention in which FIG. 7 is a longitudinal cross-sectional view of an extrusion device;

FIG. 8 is a view similar to FIG. 7 provided a tubular container being removed.

FIG. 9 is a front view of a part of the extrusion device shown in FIG. 7;

FIG. 10 is a front view of a sixth embodiment of the present invention; and

DETAILED DESCRIPTION OF PREFERRED EMBODIMENTS

Figure 1:
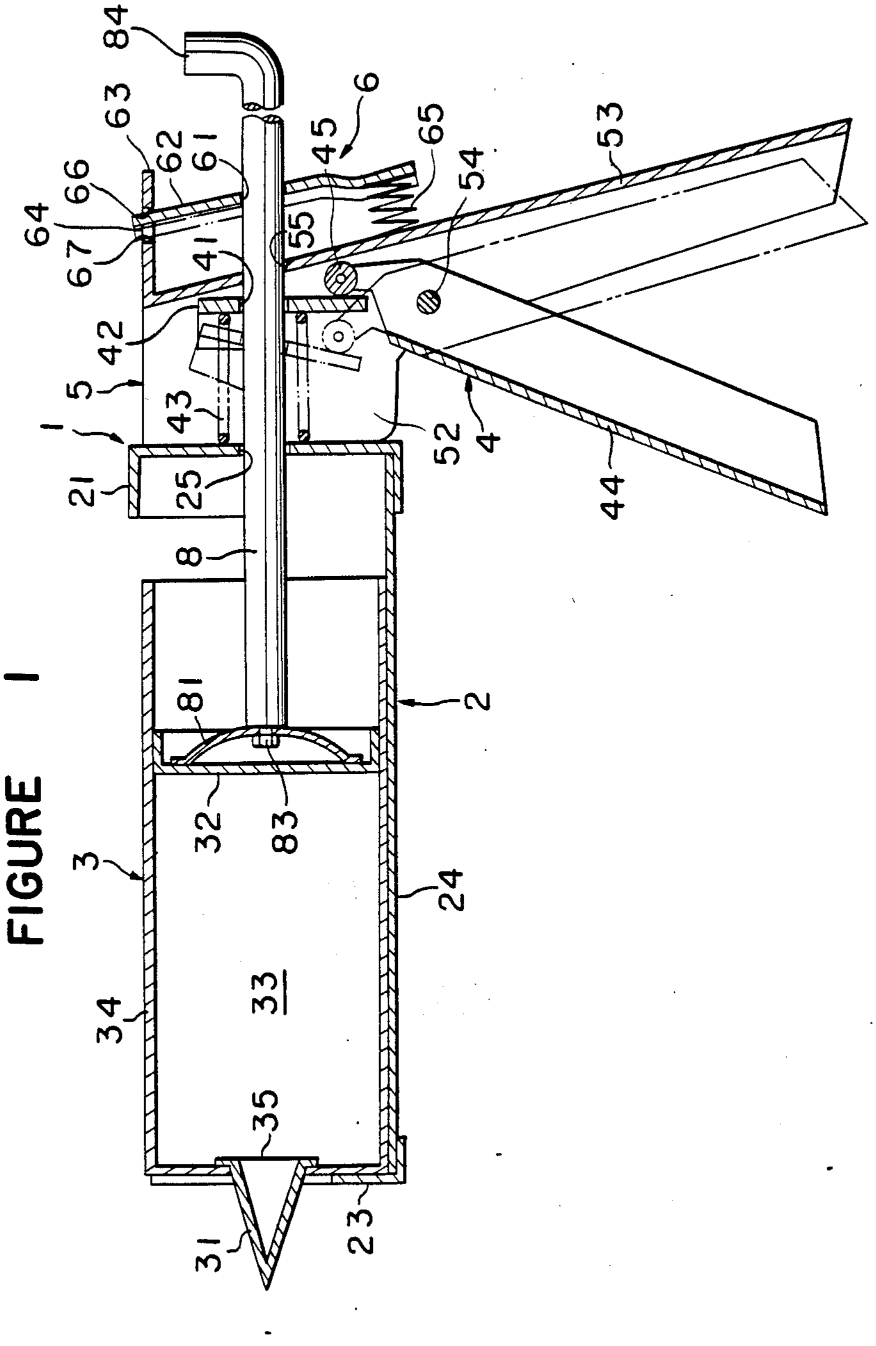
FIG. 1 is a longitudinal cross-sectional view of a first embodiment of the extrusion device of the present invention.
Figures 2, 3:
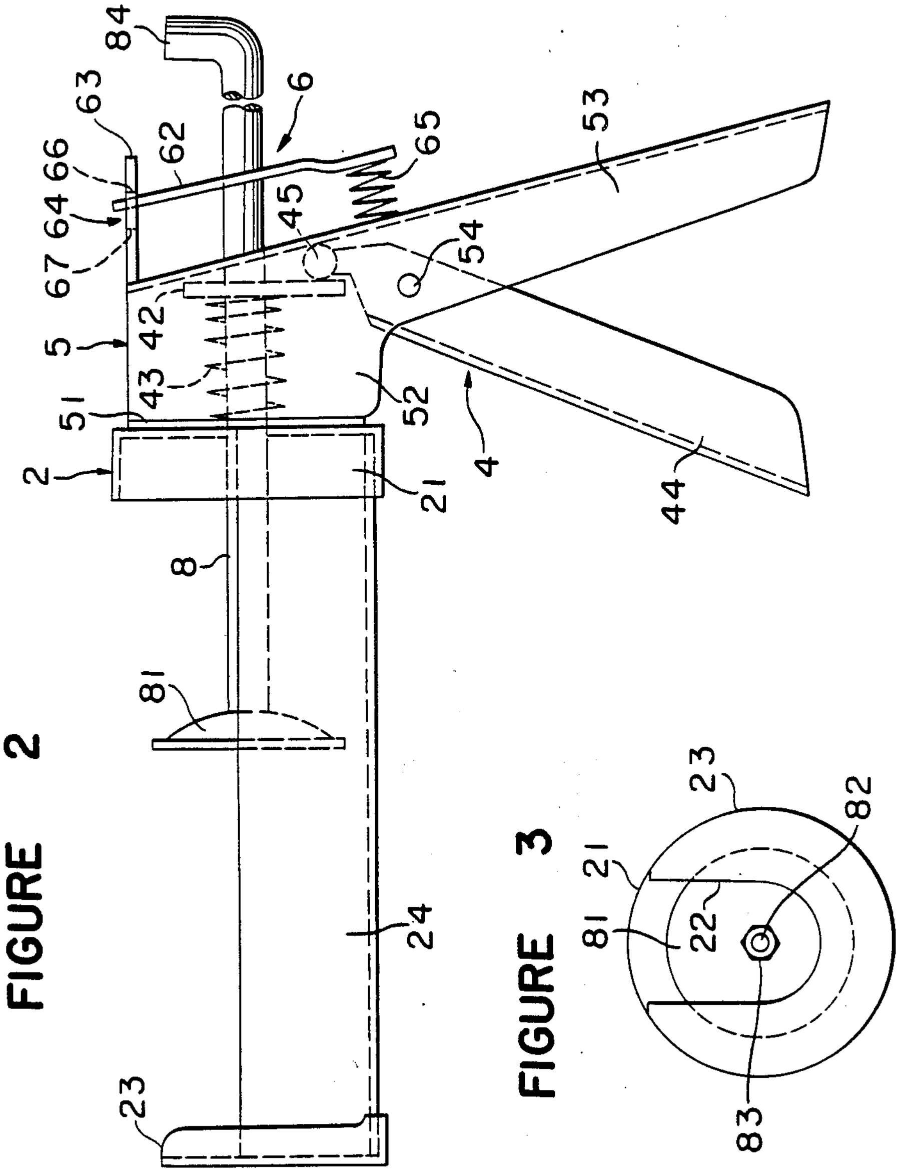
FIG. 2 is a side view showing the first embodiment of the present invention in which a cartridge type tubular container is removed.
FIG. 3 is a front view of a part of the extrusion device in FIG. 1.

FIGS. 1 to 3 show the first embodiment of the present invention in which a cartridge type tubular container 3 is supported by a receiving part 2 of an extrusion device main body 1. The extrusion device main body 1 is provided with a driving part 5 having a driving means 4 and a push rod control means 6 as well as the receiving part 2. The receiving part 2 is constituted by a base member 21 adjacent to the driving part 5, the base member being formed by stamping a metal plate into a shallow bottomed circular tube, a head part 23 made of a metal plate having a U-shaped notch 22 (see FIG. 3) and a cylindrical edge at the circular portion, and a bottom plate 24 of a metal plate having a semicircular wall, the bottom plate being connected to the base member 21 and the head part 23 by welding. Namely, the extrusion device main body 1 has a general configuration of bottomed cylinder with a half of the cylindrical wall portion removed and is adapted to receive the cartridge type tubular container 3 which is provided with a conical nozzle 31 of synthetic resin at the front end and a slidable bottom 32 at the rear end to thereby form a tubular container main body 34 in which viscous material 33 is contained. The cartridge type tubular container 3 is put on the bottom plate 24 placing the nozzle 31 through the U-shaped notch 22 of the head part 23. The tubular container 3 is previously filled with the viscous material 33 in a factory. For use of the viscous material, the top end of the nozzle 31 is cut to form a nozzle opening and a sealing 35 such as aluminum foil attached the bottom of the nozzle 31 is broken.

A through hole 25 is formed at the center of the base member 21 of the receiving part 2 and a push rod 8 is inserted in the through hole 25 so as to be slidable along the central axial direction of the bottom plate 24 having a semicircular bottom wall. A threaded portion 82 is formed at the distal end of the push rod 8, and a disk-like pressing member 81 made of a metal plate is fitted to the end of the push rod 8 and secured by a nut 83 screw-engaged with the threaded portion. A knob portion 84 is formed at the other end of the push rod 8 by bending the other end portion.

The driving part 5 has a base portion 52 having a generally U-shape in cross section and a grip portion 53 having a generally U-shape in cross section continuous to the base portion 52 and a fitting edge 51 at an end of the base portion 52, all of which is formed by stamping a metal plate integrally. The driving part 5 is connected to the bottom of the base member 21 of the receiving part 2 by welding the fitting edge 51. Inside the base portion 52 of the driving part 5, there is provided a driving piece 42. The driving piece 42 is in a rectangular shape made of a relatively thick plate-like material in which a through hole 41 having a diameter slightly greater than the outer diameter of the push rod 8 is formed. The driving piece 42 is supported by the push rod 8 by insertion of the push rod 8 in the through hole 41 so that the driving piece is slidable in the axial direction of the push rod 8 and movable with respect to the push rod 8 with some clearance between the through hole 41 and the outer circumference of the push rod 8. A coil spring 43 is interposed between the driving piece 42 and the base member 21 of the receiving part 2 and around the push rod 8 to push the driving piece 42 in the direction away from the base member 21. A pin 54 is provided near the joint portion between the base portion 52 of the driving part 5 and the grip portion 53. The upper part of a lever 44 which is formed by stamping a metal plate into a U-shape in cross section is journaled by the pin 54. A cylindrical post 45 is attached to the top of the lever 44 so as to oppose the lower part of the driving piece 42. Accordingly, when the lever 44 is turned toward the grip portion 53, the cylindrical post 45 pushes the driving piece 42 against the spring action of the coil spring 43.

When the driving piece 42 is pushed by the cylindrical post 45, it is inclined at an acute angle with respect to the axis of the push rod 8 as shown by two dotted chain lines in FIG. 1 so that the circular edge portion of the through hole 41 comes to frictional engagement with the outer circumferential surface of the push rod 8. Then, the driving piece 42 is forwarded along with the push rod 8 in the direction against the spring action of the coil spring 43. Thus, a push rod driving means 4 for forwarding the push rod 8 is constituted. The push rod 8 is inserted in a freely slidable manner in a through hole 55 formed in the base portion 52 of the driving part 5.

The push rod control means 6 comprises a control piece 62 and a coil spring 65. The control piece 62 is made of a plate-like material in which a control opening 61 having a diameter slightly larger than the outer diameter of the push rod 8 is formed in the substantially central portion in the longitudinal direction of the control piece 62. The push rod 8 is inserted in the control opening 61 and the upper end of the control piece 62 is inserted in an aperture 64 formed in a supporting plate 63 of a plate-like material which projects from the base portion 52 of the driving part 5 in substantially parallel to the axis of the push rod 8. The coil spring 65 is provided between the lower part of the control piece 62 and the base portion 52 to push the lower part of the control piece 62 in the direction opposite the forwarding direction of the push rod 8. The aperture 64 is formed to have both edges 66, 67 which oppose with a predetermined span along the axial direction of the push rod 8. When the push rod 8 is in stopped condition, the control piece 62 is urged to the edge 66 of the aperture 64 by the spring action of the coil spring 65, the edge 66 being opposite to the forwarding direction of the push rod. In this case, the control piece 62 is inclined with respect to the axial direction of the push rod 8 so that the circular edge portion of the control opening 61 is in frictional engagement with the outer circumferential surface of the push rod 8, with the result that the control piece 62 prevents movement of the push rod 8 in the direction opposite the forwarding direction.

When the push rod 8 is advanced in one direction of its axial direction, i.e. in the forwarding direction, the control piece 62 moves together with the push rod 8 while maintaining the frictional engagment with the push rod 8. When the upper end of the control piece comes to contact with the other edge 67 of the aperture 64, the coil spring 65 is further compressed according to the movement of the push rod 8 whereby an angle of inclination with respect to the push rod 8 is changed and the frictional engagement of the control opening 61 with the push rod 8 is weakened. Accordingly, the control piece 62 remains in the position to allow the movement of the push rod 8 in its axial direction. When the movement of the push rod 8 by means of the driving piece 42 is stopped, the angle of inclination of the control piece 62 becomes larges by the action of the coil spring 65, and the control piece 62 is again brought into frictional engagement with the push rod 8. Then, the push rod 8 is movable in the direction opposite the forwarding direction until the upper end of the control piece 62 comes into contact with the edge 66 of the aperture 64.

When the extrusion device main body 1 is held by one hand and the lever 44 is turned toward the grip portion 53 by the other hand, the push rod 8 is forwarded in one direction along the axial direction by means of the driving piece 42, whereby the slidable bottom 32 of the tubular container 3 is pushed by the pressing member 81 attached at the front end of the push rod 8 and the viscous material 33 is extruded from the nozzle 31. In this case, the upper end of the control piece 62 is in contact with the edge 67 of the aperture 64 and the control piece 62 remains at a position compressing the coil spring 65. When the lever 44 is released to stop the forwarding operation of the push rod 8, the control piece 62 comes to frictional engagment with the push rod 8 at that position. At the same time, the force causing the driving piece 42 to incline at an acute angle with respect to the push rod 8 disappears, whereby the frictional engagement between the driving piece 42 and the push rod 8 also disappears, and the driving piece 42 and the lever 44 return to their original positions while the push rod 8 remains at the stop position. In this case, a force caused by expansion of air remaining in the tubular container 3 and compressed during the forwarding operation of the push rod 8 acts on the push rod 8. Therefore, the push rod 8 is moved in the direction opposite the forwarding direction from a position that the upper end of the control piece 62 is in contact with the edge 67 of the aperture 64 into a position that the upper end comes to contact with the other edge 66. By the movement of the push rod 8, expansion of the air compressed in the tubular container 3 is absorbed to prevent unwanted discharge of the viscous material 33 from the nozzle 31. Thus, the extrusion device being free from unwanted discharge of the viscous material can be attained by determination of the distance between the edges 66, 67 of the aperture 64 to be sufficient to absorb expansion of air compressed, in consideration of the length of stroke of the driving piece 42.

Figure 4:
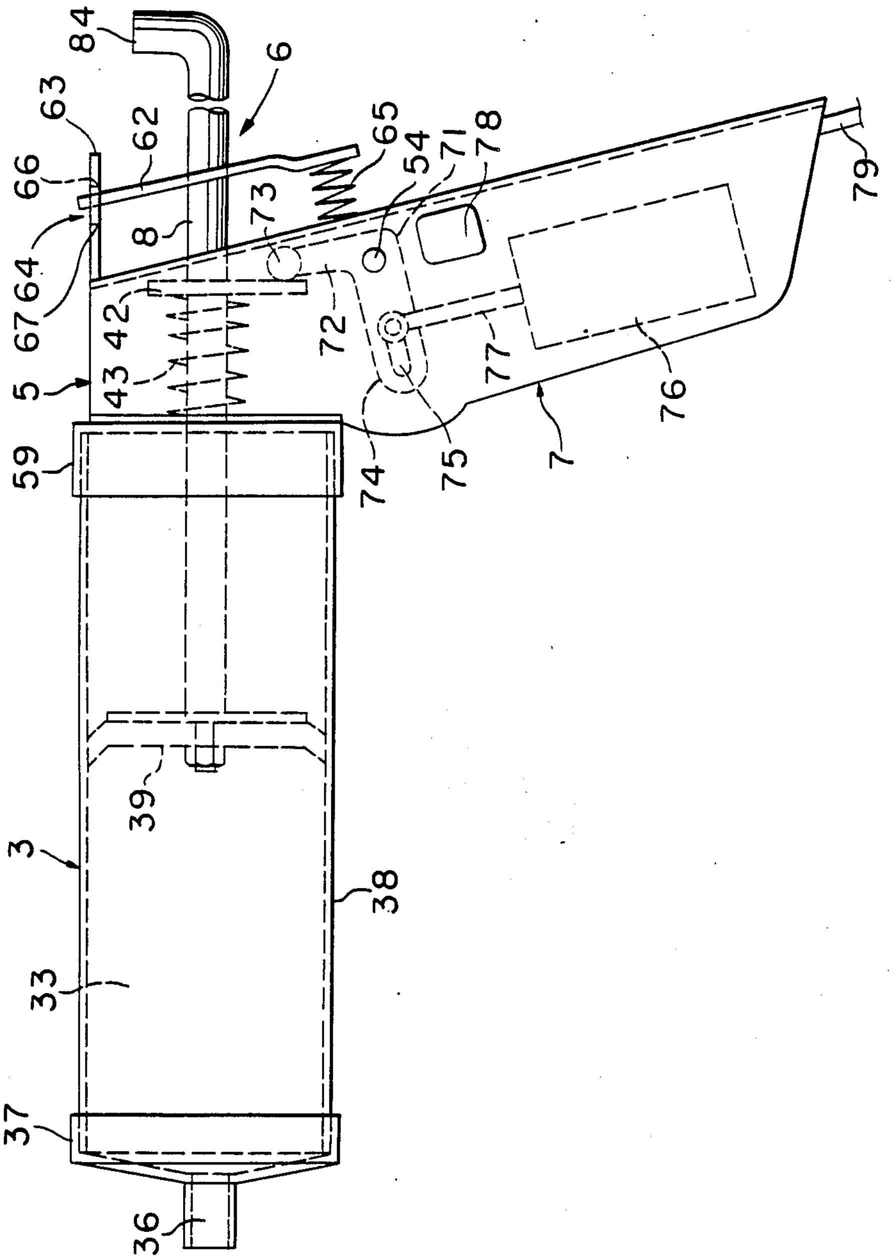
FIG. 4 is a side view of a second embodiment of the present invention.

FIG. 4 shows a second embodiment of the present invention. In this embodiment, changes in two points are made. Firstly, the tubular container 3 is formed integrally with the extrusion device main body 1.

Namely, the tubular container 3 is formed in such a manner that a head part 37 with a nozzle 36, which may be shaped by stamping a plate-like material into a bottomed tubular body, is screw-fitted to a cylindrical main body 38. An end portion of the main body 38 is connected by welding to a cylindrical fitting edge 59 which is adjacent to the driving part 5, and a piston 39 fitted to the inner surface of the cylindrical main body 38 is connected to the top end of the push rod 8. Secondly, the driving means 4 has been replaced by an electrically driving unit 7. Namely, the driving means is constructed in such a manner that a lever 71 made of an L-shaped plate-like material is journaled at its bent portion by the pin 54; a cylindrical post 73 similar to the cylindrical post 45 is attached to the end of one leg 72 of the lever 71; an elongated hole 75 is formed in the other leg 74; an electromagnetic solenoid 76 is provided in the grip portion 53 of the driving part 5; the end of an operating rod 77 of the electromagnetic solenoid 76 is engaged with the elongated hole 75 of the leg 74 in a slidable manner; and a normally opened switch 78 is attached to the grip portion 53. When the normally opened switch 78 is closed, the electromagnetic solenoid 76 is actuated by a power source (not shown) through a conductor 79 to retract the operating rod 77 to thereby cause turning movement of the lever 71. In FIG. 4, the same reference numerals as in FIGS. 1 to 3 designate the same parts, and therefore, description is omitted.

In the modified embodiment in which the tubular container 3 is formed integrally with the extrusion device main body 1, the extrusion device is used as follows. The nozzle 36 is inserted in a container for transportion or storage in which viscous material is filled, the control piece 62 of the push rod control means 6 is pushed to compress the coil spring 65 to thereby release frictional engagement with the push rod 8, and then the knob portion 84 formed at the rear end of the push rod 8 is pulled to retract the push rod to thereby introduce the viscous material 33 into the cylindrical main body 38. Alternatively, the head part 37 is removed from the cylindrical main body 38, viscous material 33 is filled in the main body 38 directly from the container, and thereafter the head part 37 is screw-fitted to the cylindrical main body 38.

The electrically driving unit 7 causes an angular movement of the lever 71 each time the normally opened switch 78 is pushed by the user's fingers. The driving piece 42 is pushed by the cylindrical post 73 to forward the push rod 8 for extrusion of the viscous material 33. The function and effect in this embodiment is the same as the embodiment in FIGS. 1 to 3, and therefore, description is omitted.

The change in design in two points as described above may be done for the embodiment in FIG. 4. However, either one change of design may be applied to the embodiment shown in FIGS. 1 to 3.

Figure 5:
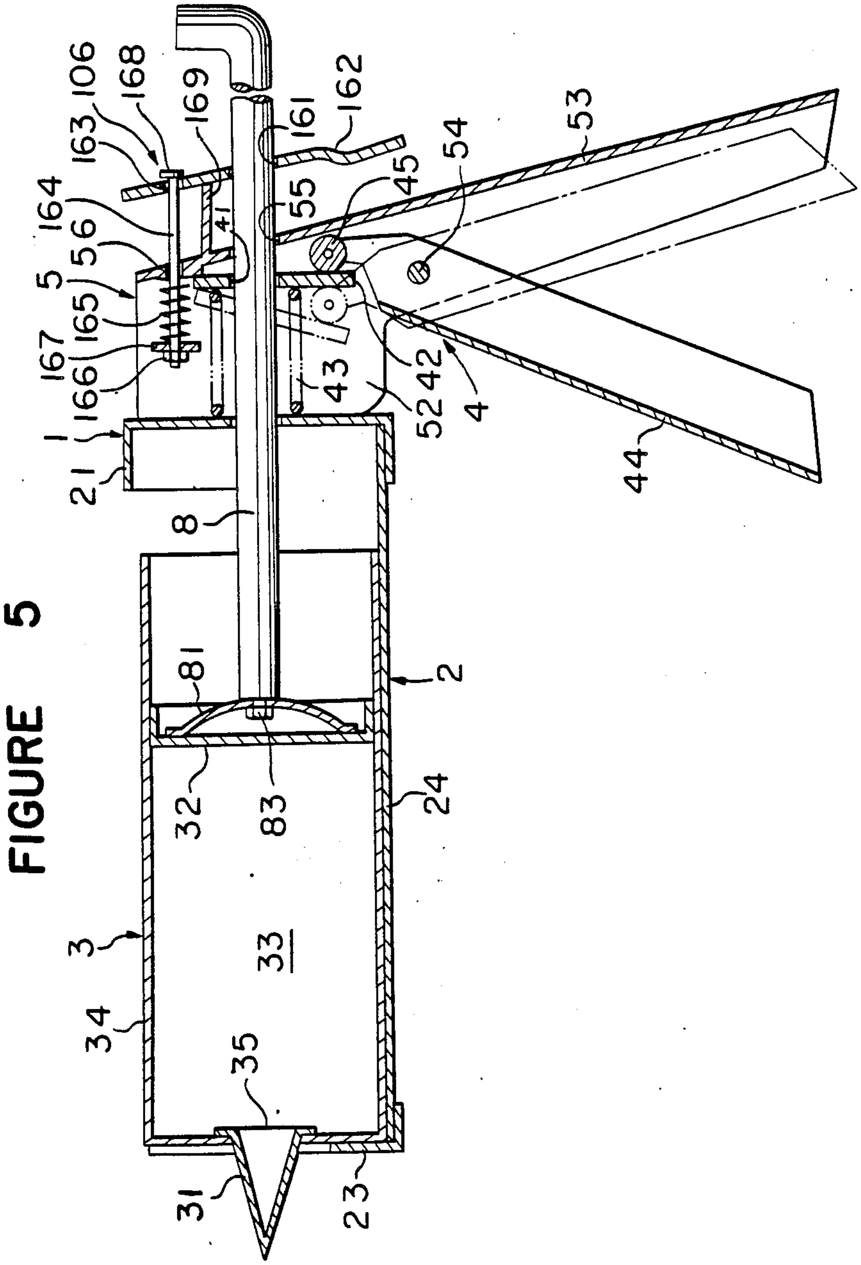
FIG. 5 is a longitudinal cross-sectional view of a third embodiment of the present invention.

FIG. 5 shows a third embodiment of the present invention. The third embodiment is of a type in which the cartridge type tubular container 3 is received in the receiving part 2 of the main body 1 as in to the embodiment shown in FIG. 1. The construction of the driving part containing the driving means 4 is also identical with that of the embodiment in FIGS. 1 to 3. Accordingly, the same reference numerals as in FIGS. 1 to 3 designate the same parts and therefore, description is omitted.

In the third embodiment, the construction of a push rod control means 106 is different from that of the first embodiment. Namely, the push rod control means 106 is so constructed that a control piece 162 formed of a plate-like material has a control opening 161 having a diameter slightly greater than the outer diameter of the push rod 8 and formed at the substantially central portion in the longitudinal direction of the control piece 162. The push rod 8 is inserted in the control opening 161. A pulling rod 164 is slidably inserted in a through hole 163 formed at the upper part of the control piece 162 and a through hole 56 formed in the base portion 52 of the driving part 5 so as to be in substantially parallel to the axial direction of the push rod 8. An end of the pulling rod 164 extending in the base portion 52 has a threaded portion. A coil spring 165 is interposed between the inner surface of the base portion 52 and a stop piece 167 which is retained by a nut 166 fastened by screw engagement with the threaded portion of the pulling rod 164. An enlarged portion 168 is formed on the other end of the pulling rod 164 to exert the spring action of the coil spring 165 on the control piece 162. A supporting plate 169 of a plate-like material whose one end is connected to the base portion 52 by welding and which extends in substantially parallel to the push rod 8 is provided so that the other end of the supporting plate 169 is in contact with the control piece 162 at the intermediate position between the control opening 161 and the through hole 163. Accordingly, the upper part of the control piece 162 is pulled by the pulling rod 164 by the aid of the coil spring 165 around the fulcrum point at the top end of the supporting plate 169 to be inclined at an acute angle with respect to the axis of the push rod 8, whereby the circular edge portion of the control opening 161 is frictionally engaged with the outer circumferential surface of the push rod 8.

In the third embodiment, when the push rod 8 is pushed forwardly in its axial direction by the driving means 4, the control piece 162 is caused to turn around the fulcrum point at the top end of the supporting plate 169 due to friction between the control opening 161 and the push rod 8 to change the inclination angle. Change in the inclination angle of the control piece 162 weakens the frictional engagement with the push rod 8. Accordingly, the forwarding movement of the push rod 8 is allowed by the control piece 162 with the changed inclination angle. When the push rod 8 is stopped, strong frictional engagement between the control piece 162 and the push rod 8 is established by the spring action of the coil spring 165. At the moment, a force of expansion of air compressed in the tubular container 3 acts on the push rod 8 in the direction opposite the forwarding direction. Then, the control piece 162 moves together with the push rod 8 maintaining the frictional engagement with the push rod 8 in the direction opposite the forwarding direction of the push rod while compressing the coil spring 165. By the retracting movement of the push rod 8, expansion of air compressed in the container is absorbed, whereby unwanted discharge of the viscous material 33 from the nozzle 31 is prevented.

Figure 6:
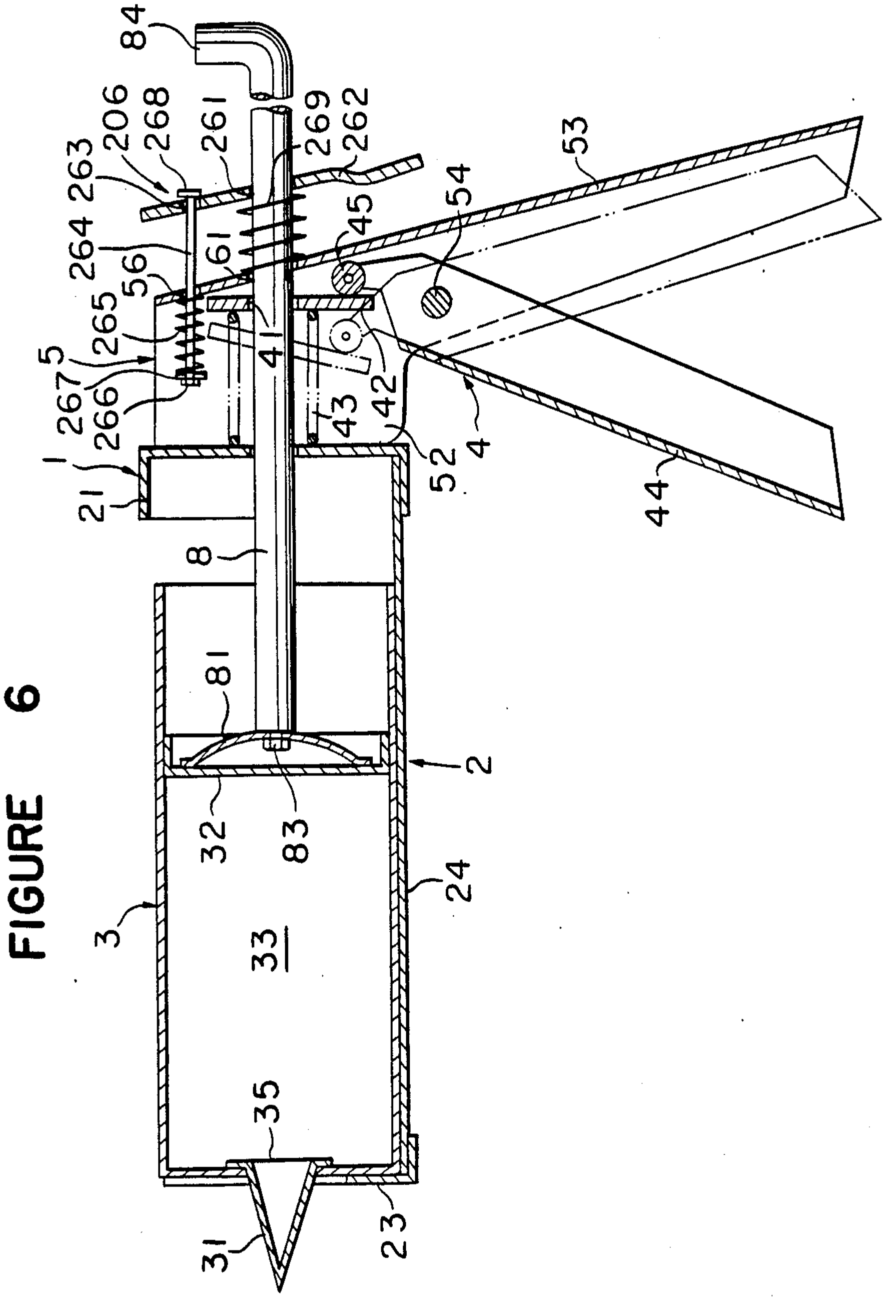
FIG. 6 is a longitudinal cross-sectional view of a fourth embodiment of the present invention.

FIG. 6 shows a fourth embodiment of the present invention. The fourth embodiment is of a type similar to the first embodiment in which a cartridge type tubular container 3 is received in a receiving part 2 of an extrusion device main body 1 and a driving part 5 includes a driving means 4. Accordingly, the same reference numerals as in FIGS. 1 to 3 designate the same parts, and therefore, description is omitted.

In the fourth embodiment, the construction of a push rod control means 206 is different from those of the first and third embodiments. Namely, the push rod control means 206 is constructed in such a manner that a control piece 262 is formed of a plate-like material and has a control opening 261 having a diameter slightly larger than the outer diameter of the push rod 8 at the substantially central portion in the longitudinal direction of the control piece 262. The push rod 8 is inserted in the control opening 261. A pulling rod 264 is slidably inserted in a through hole 263 formed at the upper part of the control piece 262 and the through hole 56 formed in the base portion 52 of the driving part 5 so as to be in substantially parallel to the axis of the push rod 8. A first coil spring 265 is interposed between a stop piece 267 adjacent to a nut 266 which is screw-fitted to an end of the pulling rod 264 and the inner surface of the base portion 52. The first coil spring 265 is wound around the pulling rod 264 so that the spring action of the first coil spring 265 is exerted on the control piece 262 by means of an enlarged portion 268 formed at the other end of the pulling rod 264. A second coil spring 269 is interposed between the control piece 262 and the base portion 52 and is wound around the push rod 8 so as to push the control piece 262 in the direction opposite the forwarding direction of the push rod 8, whereby the control piece 262 is caused to be inclined at an acute angle with respect to the axis of the push rod 8 and the circular edge portion of the control opening 261 is frictionally engaged with the outer circumferential surface of the push rod 8.

In the fourth embodiment, when the push rod 8 is forwarded by the driving means 4, the control piece 262 keeping the frictional engagement with the push rod 8 moves, the one hand, to compress the second coil spring 269 and on the other hand to release the compression of the first coil spring 265. Accordingly, when the second coil spring 269 is slightly compressed and the first coil spring 265 slightly elongated, the inclination angle of the control piece 262 to the push rod 8 is changed to weaken the frictional engagement with the push rod 8, and the push rod 8 is further forwarded while the control piece 262 is left at a position where the inclination angle is changed. When the movement of the push rod 8 is stopped, frictional engagement is again established between the control piece 262 and the push rod 8 by the spring action of the second coil spring 269. In this case, expansion of air compressed in the tubular container 3 acts on the push rod 8 in the direction opposite the forwarding direction. Accordingly, the control piece 262 moves compressing the first coil spring 265 in the direction opposite the forwarding direction of the push rod 8 while keeping the frictional engagement with the push rod 8, thereby absorbing a force of expansion of the compressed air, with the result of prevention of the unwanted discharge of viscous material 33 from the nozzle 31.

In the fourth embodiment, the second coil spring 269 serves as a fulcrum point for the control piece 262. For the purpose of this, the spring action of the second coil spring 269 is made sufficiently greater than that of the first coil spring 265.

It is possible that change of design concerning two points described with reference to FIG. 4 is made simultaneously or separately to the third and fourth embodiments.

Thus, according to the first to the fourth embodiments of the present invention, when viscous material filled in the tubular container is extruded from the nozzle formed at the front end of the tubular container by forwarding the push rod in one direction along the axial direction, the control piece of the push rod control means moves with the push rod for a predetermined distance because the circular edge portion of the control opening of the control piece is frictionally engaged with the outer circumferential surface of the push rod. When the push rod is further advanced over the predetermined distance, the inclination angle of the control piece with respect to the axis of the push rod is changed to weaken the frictional engagement with the push rod, whereby the forwarding movement of the push rod is not hindered. When the push rod is stopped to go forward, i.e. extruding operation for the viscous material is stopped, the push rod control means causes the control piece to be inclined at an acute angle again with respect to the axis of the push rod by the spring action of the coil spring to establish the frictional engagement with the push rod at a position where the push rod is stopped. In this case, when a force of expansion of air compressed in the tubular container acts on the push rod in the direction opposite the forwarding direction of the push rod, the push rod moves in the opposite direction together with the control piece for a predetermined distance to absorb the expansion of the air. When the forwarding movement of the push rod is started again, the viscous material can be extruded.

As described above, since expansion of air in the tubular container is absorbed by the retracting movement of the push rod, unwanted discharge of the viscous material in the tubular container can be prevented. Further, waste of the viscous material and unexpected contamination of an operator's body and place for working are avoided.

In the foregoing embodiments, it is possible to use a driving means in which the push rod is forwarded in one direction along its axial direction when the driving means is actuated and the push rod is allowed to move in the direction opposite the former direction when the driving means is in non-operation.

Figure 7:
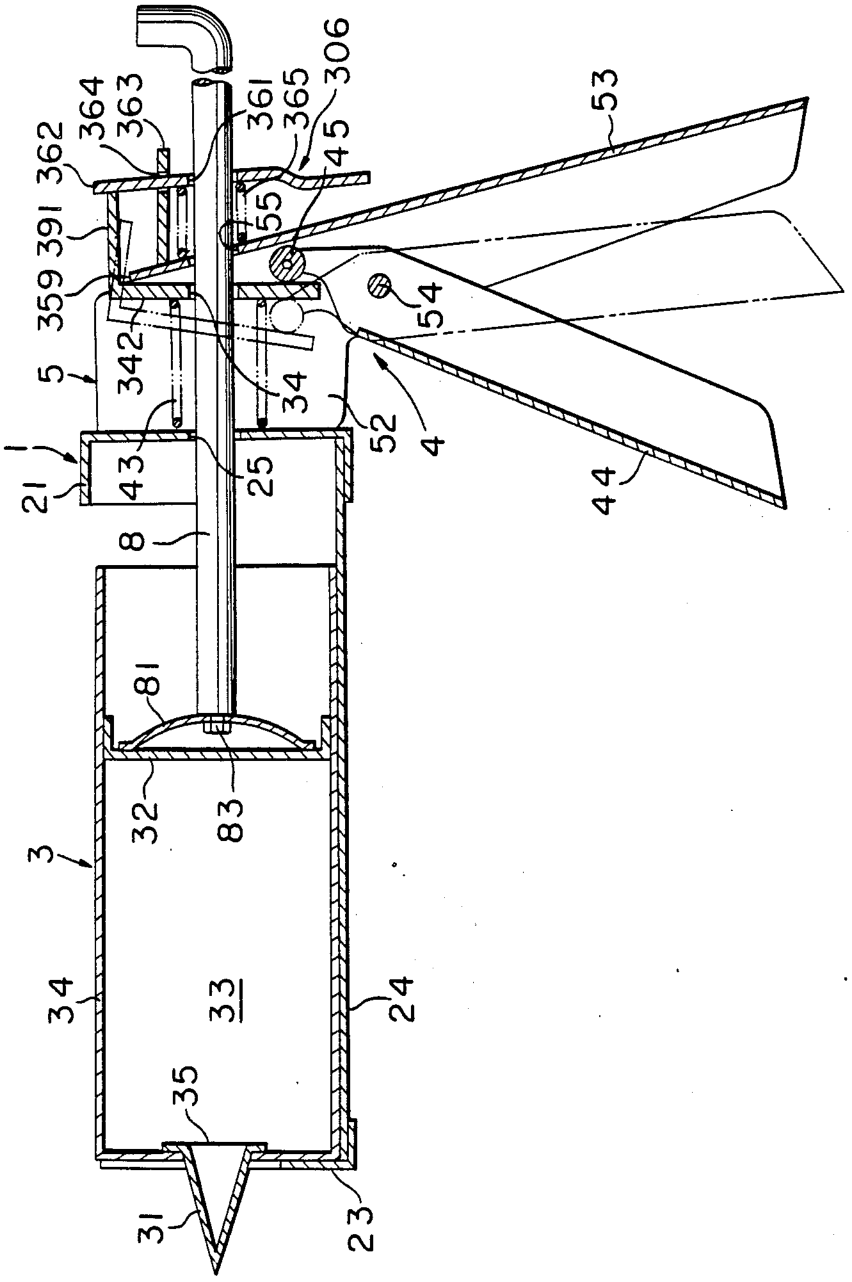
Figure 8:
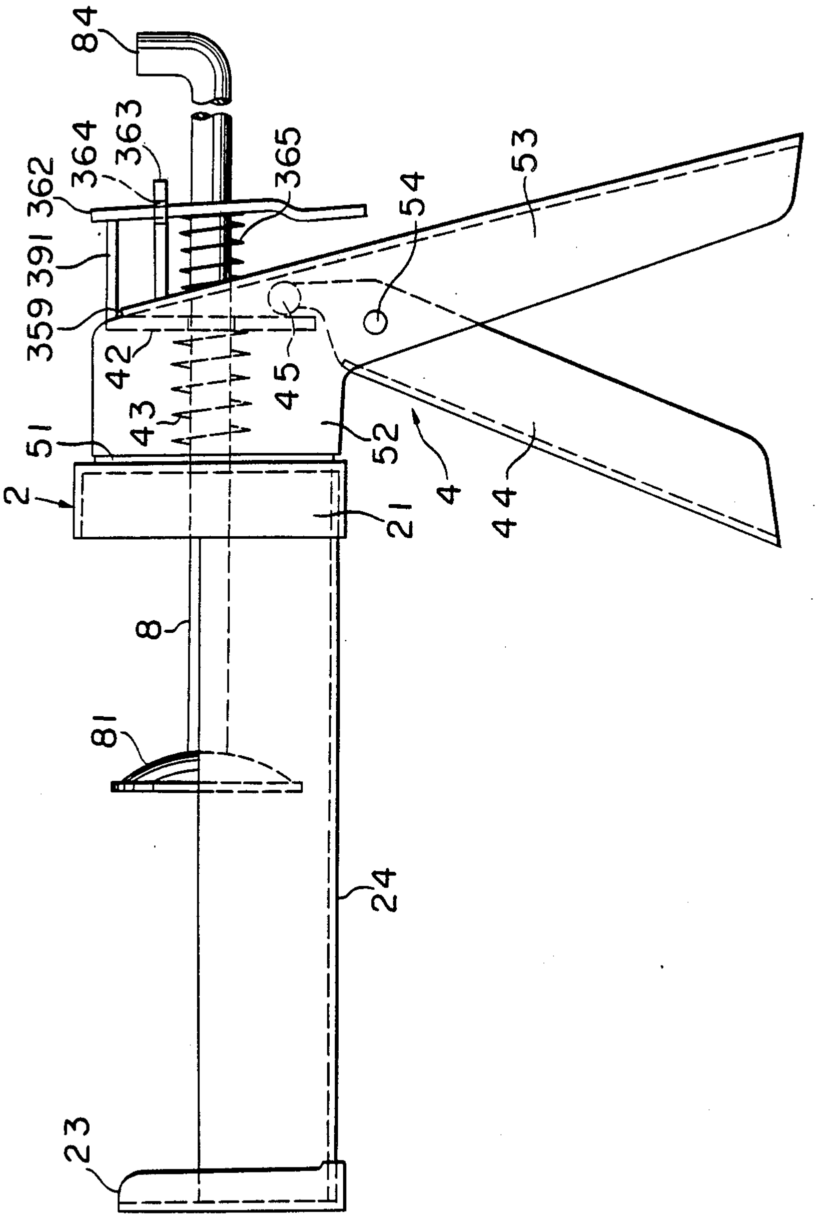
Figures 9, 10:
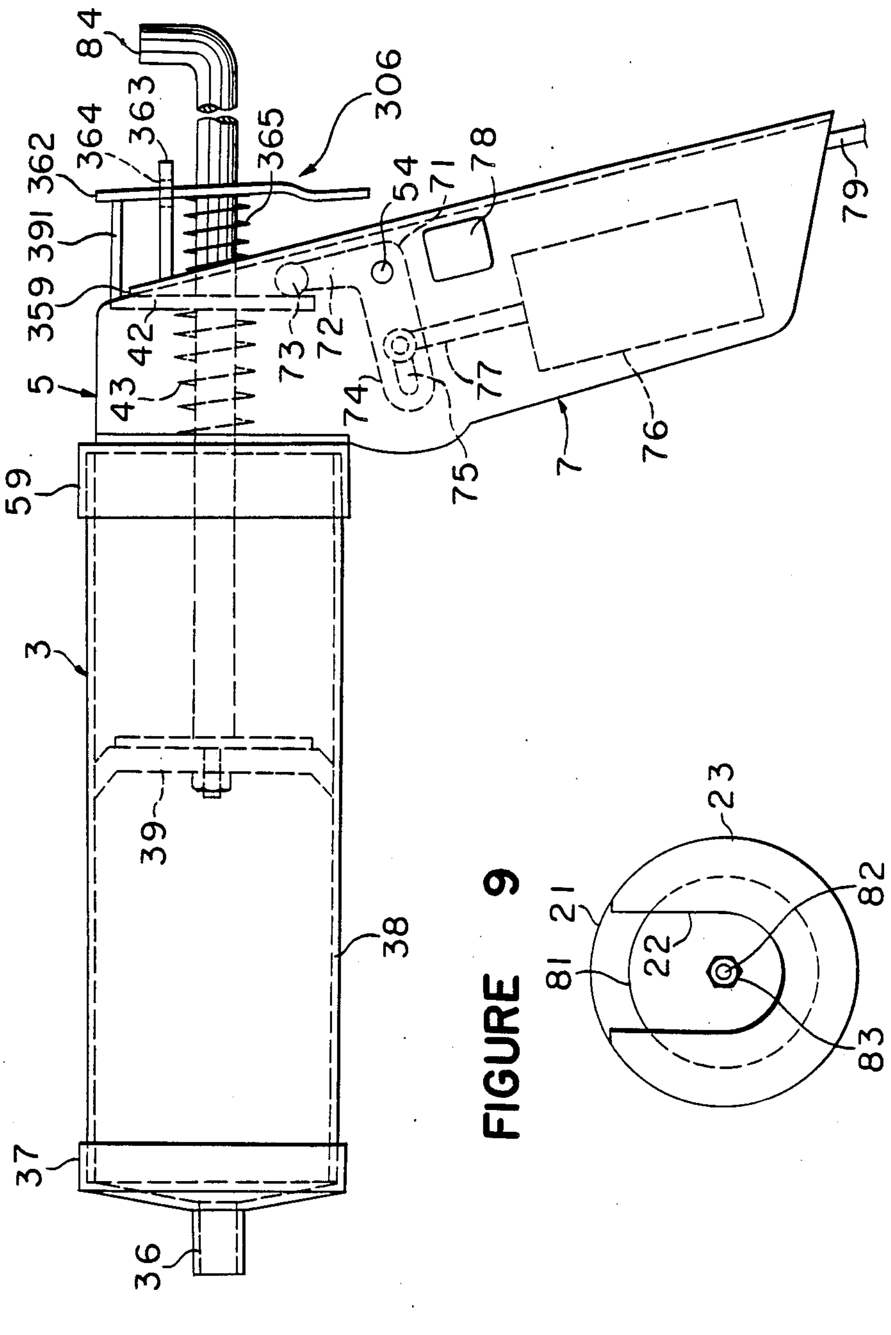

FIGS. 7 to 9 show a fifth embodiment of the present invention. In the figures, the same reference numerals as in FIGS. 1 to 6 designate the same parts, and therefore, description of these parts is omitted.

Inside the base portion 52 of the driving part 5, there is provided a driving piece 342 formed of a rectangular thick plate-like material in which a control opening 341 having a diameter slightly greater than the outer diameter of the push rod 8 is formed. The driving piece 342 is slidable in the axial direction of the push rod with some clearance by inserting the push rod 8 in the control opening 341.

A push rod control means 306 has a control piece 362 formed of a plate-like material in which a control opening 361 having a diameter slightly larger than the outer diameter of the push rod 8 at the substantially central portion in the longitudinal direction of the control piece 362. The push rod 8 is inserted in the control opening 361. The control piece 362 is turnably supported at a portion above the control opening 361 by inserting that portion in an aperture 364 which is formed in a supporting plate 363 projecting from the base portion 52 of the driving part 5 extending in substantially parallel to the axial direction of the push rod. A second coil spring 365 is wound around the push rod 8 and between the control piece 362 and the base portion 52, whereby the control piece 362 is pushed in the second direction along the axis of the push rod, which is opposite the forwarding direction of the push rod.

The driving piece 342 has at the upper end a releasing piece 391 extending at the right angle in the second direction of the axial direction of the push rod 8 so that the releasing piece 391 projects outwardly from the base portion 52. A recess 359 is formed at the upper part of the base portion 52 of the driving part 5. The length of the releasing piece 391 is so determined that when the driving piece 342 is brought to a critical position in the second direction along the axial direction of the push rod 8, namely, the original position of the driving piece 342, it comes in contact with the upper part of the control piece 362 to push it, with the result that the control piece 362 is turned around the fulcrum point at the aperture 364 of the supporting plate 363 in the direction compressing the second coil spring 365, whereby the inclination angle of the control piece 362 to the push rod 8 is changed thereby to release frictional engagement between the circular edge portion of the control opening 361 and the outer circumferential surface of the push rod 8.

According to the fifth embodiment, when the extrusion device main body 1 is held by gripping the grip portion 53 and the lever 44, and the lever 44 is repeatedly operated around the pin 54, the push rod 8 is intermittently forwarded in the first direction along the axis of the push rod to extrude the viscous material 33 from the nozzle 31 of the tubular container 3. While the lever 44 is operated, the push rod is stopped each time of the operation by means of the control piece 362. However, when an operator stops to extrude the viscous material by making the lever 44 free, the driving piece 342 is returned to the critical position in the second direction (i.e., to its original position) by the spring action of the coil spring 43. At the moment, the releasing piece 391 projecting from the upper end of the driving piece 342 comes in contact with the upper part of the control piece 362 to change the inclination angle of the control piece 362. The change of the angle for the control piece 362 releases the frictional engagement between the control piece 362 and the push rod 8. When the forwarding movement of the push rod 8 in the first direction is stopped, there is tendency of expansion of air compressed in the tubular container 3 due to pressure applied by the push rod 8. A force of expansion of air functions on the one hand to extrude the viscous material 33 from the nozzle 31 and on the other hand to return the push rod 8 in the second direction. In this case, however, since the frictional engagement between the control piece of the push rod control means 6 and the push rod 8 is released by the releasing piece 391, the push rod 8 is returned in the second direction due to expansion of air thereby absorbing the force of expansion of air to prevent unwanted discharge of the viscous material 33 from the nozzle 31.

FIG. 10 shows a sixth embodiment of the extrusion device in which the relating means as shown in FIGS. 7 to 9 is applied to the embodiment shown in FIG. 4.

Figure 11:
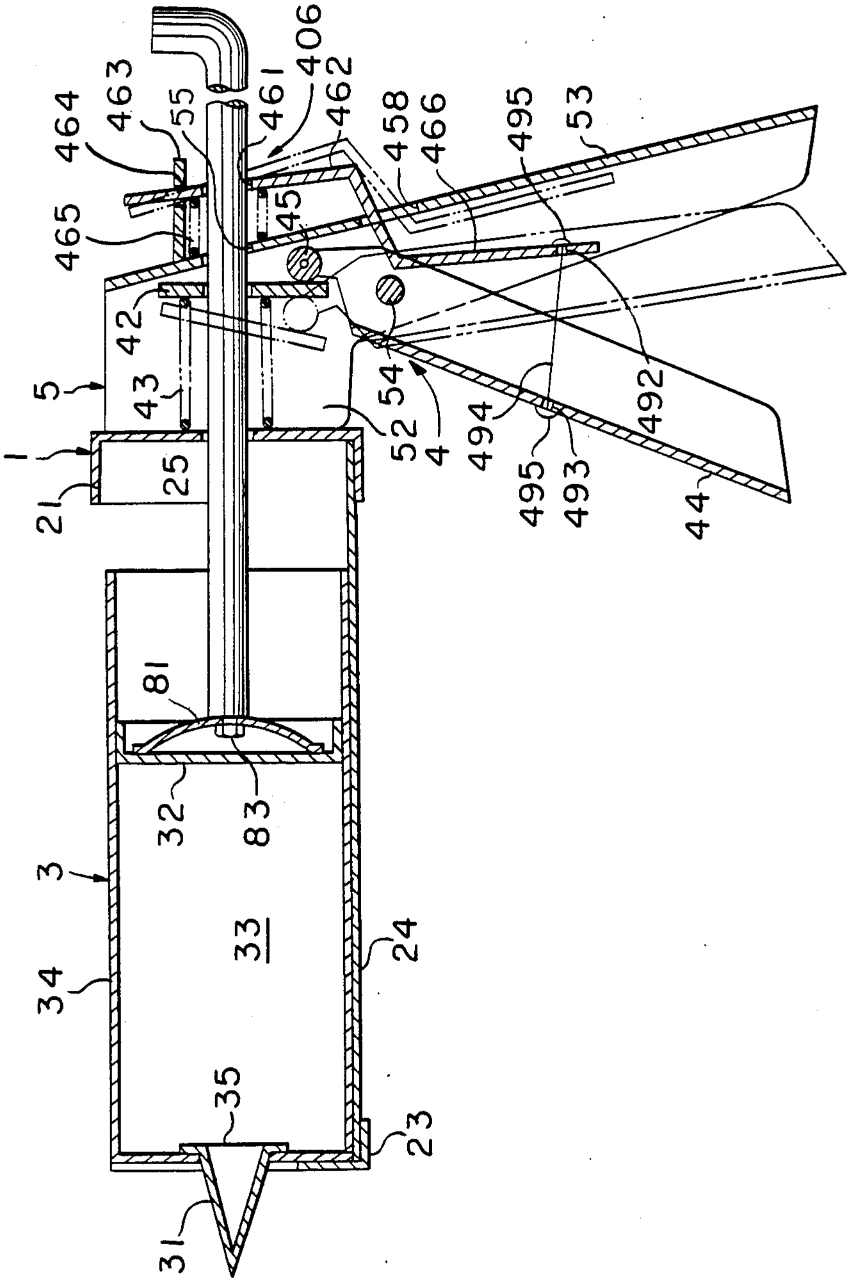
FIG. 11 is a longitudinal cross-sectional view of a seventh embodiment of the present invention.

FIG. 11 shows a seventh embodiment of the present invention in which a cartridge type tubular container 3 is received in the receiving part 2 of the extrusion device main body 1 which is similar to the embodiment in FIG. 7. The construction of the driving part 5 containing the driving means 4 is also identical with that in FIGS. 7 to 9. Accordingly, the same reference numerals as in FIGS. 7 to 9 designate the same parts, and therefore, description of these parts is omitted.

In the seventh embodiment, a push rod control means 406 comprises a control piece 462, a supporting plate 463 having an aperture 464, and a second spring 465. The control piece 462 has an extension 466 at the lower part which is integrally formed with the control piece 462. The lower part of the extension 466 extends inside the grip portion 53 through a through hole 458 formed in the base portion 52 of the driving part 5 or the grip portion 53. A hole 492 is formed in the lower part of the extension 466, and a hole 493 is formed in the lever 44 opposing the hole 492. A wire 494 having head portions 495 at both ends extends between the holes 492, 493 with the head portions 495 engaging with the holes. The length of the wire 494 is determined such that when the driving piece 42 is returned to a critical position in the second direction along the axial direction of the push rod 8 (namely, its original position) by the spring action of the coil spring member 43, and the lever 44 is also returned to the original position by the driving piece 42, the control piece 462 is turned around the fulcrum point at the aperture 464 of the supporting plate 463 against the spring action of the second spring 465 to change the inclination angle of the control piece 462 with respect to the push rod 8, whereby the frictional engagement between the control piece 462 and the push rod 8 is released.

In the seventh embodiment, the function of extruding the viscous material 33 by the operation of the lever 44 is the same as that in the fourth embodiment. However, when a force exerted by the operator's hand is applied to the lever 44, tension of the wire 494 is released, whereby the function of the control piece 62 for preventing the movement of the push rod 8 in the second direction can not be hindered. When the lever 44 becomes free from the operator and extruding operation of the viscous material 33 is stopped, namely, the driving piece 42 is returned to the original position and the lever 44 is also returned to the original position, the wire 494 extends tightly so as to pull the extension 466. Then, the inclination angle of the control piece 462 is changed and the frictional engagement between the control piece 462 and the push rod 8 is released to render the movement of the push rod 8 in the second direction to be free. Accordingly, a force of expansion of air compressed in the tubular container 3 is absorbed as in the fourth embodiment, whereby unwanted discharge of the viscous material 33 from the nozzle 31 is prevented.

The change of design in two points described with reference to the embodiment as shown in FIG. 4 can also be possible for the seventh embodiment.

Thus, in the seventh embodiment, when the lever 44 is operated to move the driving piece 42 in the first direction, the push rod 8 is forwarded in the first direction by the frictional engagement between the driving piece 42 and the push rod 8. On the other hand, when the driving piece 42 is moved in the second direction, the push rod 8 is retained at a position that the push rod 8 has been moved in the first direction. By the intermittent movement of the push rod 8, a desired amount of the viscous material 33 can be extruded from the tubular container 3 to apply to a desired point.

In addition to the above-mentioned construction, the seventh embodiment of the present invention comprises a releasing means for disengaging the push rod from the control piece when the driving piece is brought to a critical position in the second direction for the push rod. For instance, the releasing means is provided with a releasing piece extending from the driving piece to be in contact with the control piece or a releasing wire connecting the extension of the control piece to the lever. Accordingly, when the driving piece comes to a critical position in the second direction without any operational force applied to the lever due to interruption of extrusion, the frictional engagement between the push rod and the control piece is released, and a force of expansion of air compressed in the tubular container can be absorbed without prevention of the movement of the push rod in the second direction. Thus, a cause of unwanted discharge of the viscous material can be eliminated.

What is claimed is:

1. An extrusion device for extruding viscous material, said extrusion device comprising:

(a) a main body adapted to receive a tubular container containing viscous material and having a nozzle at the distal end and a slidable bottom at the proximal end;

(b) a push rod supported by said main body so as to be slidable in the axial direction of said main body, whereby, in use, viscous material in a tubular container received in said main body is extruded from the nozzle at the distal end of the tubular container when the slidable bottom at the proximal end of the tubular container is pushed toward the distal end of said main body by said push rod; and (c) a push rod control means comprising:

(i) a supporting plate projecting from said main body at least generally parallel to the axial direction of said push rod, said supporting plate having an aperture therethrough;

(ii) a control piece having a first end, a second end, and a control opening therethrough intermediate its first and second ends, said control opening receiving said push rod, the first end of said control piece being received in said aperture in said supporting plate and being both axially movable relative to said push rod and said main body and pivotably movable relative to said push rod and said main body; and (iii) a first spring member interposed between said main body and the second end of said control piece, said first spring member urging said control piece to pivot into an inclined position relative to the axis of said push rod, in which inclined position opposed portions of the periphery of said control opening frictionally engage said push rod, which frictional engagement is maintained when said push rod and said control piece are moved axially relative to said main body until contact of said control piece with the periphery of said aperture causes said control piece to pivot relative to said push rod so as to release the frictional engagement between said push rod and the opposed portions of the periphery of said control opening.

2. An extrusion device as recited in claim 1 wherein:

(a) said push rod is circular in cross-section and (b) said control opening is circular in shape.

3. An extrusion device as recited in claim 1 wherein said first spring member is a coil spring.

4. An extrusion device for extruding viscous material, said extrusion device comprising:

(a) a main body adapted to receive a tubular container containing viscous material and having a nozzle at the distal end and a slidable bottom at the proximal end;

(b) a push rod supported by said main body so as to be slidable in the axial direction of said main body, whereby, in use , viscous material in a tubular container received in said main body is extruded from the nozzle at the distal end of the tubular container when the slidable bottom at the proximal end of the tubular container is pushed toward the distal end of said main body by said push rod; and (c) a push rod control means comprising:

(i) a supporting plate projecting from said main body at least generally parallel to the axial direction of said push rod;

(ii) a control piece having a first end, a second end, and a control opening therethrough formed in the first end of said control piece and receiving said push rod, said control piece being both axially movable relative to said push rod and said main body and pivotally movable relative to said push rod and said main body, said supporting plate contacting said control piece intermediate the first and second ends of said control piece; and (iii) a first spring member acting on the second end of said control piece and urging said control piece to pivot into an inclined position relative to the axis of said push rod, in which inclined position opposed portions of the periphery of said control opening frictionally engage said push rod, which frictional engagement is maintained when said push rod and said control piece are moved axially relative to said main body until contact of said control piece with said supporting plate causes said control piece to pivot relative to said push rod so as to release the frictional engagement between said push rod and the opposed portions of the periphery of said control opening.

5. An extrusion device as recited in claim 4 wherein:

(a) said push rod is circular in cross-section and (b) said control opening is circular in shape.

6. An extrusion device as recited in claim 4 wherein :

(a) a first throughhole is formed in the second end of said control piece;

(b) a pulling rod is received in said first throughhole; and (c) said first spring member acts on said pulling rod.

7. An extrusion device as recited in claim 6 wherein:

(a) said pulling rod passes through a second throughhole in said main body;

(b) a spring seat is mounted on said pulling rod; and (c) said first spring member bears at one end against said spring seat and at the other end against said main body.

8. An extrusion device for extruding viscous material, said extrusion device comprising:

(a) a main body adapted to receive a tubular container containing viscous material and having a nozzle at the distal end and a slidable bottom at the proximal end;

(b) a push rod supported by said main body so as to be slidable in the axial direction of said main body, whereby, in use, viscous material in a tubular container received in said main body is extruded from the nozzle at the distal end of the tubular container when the slidable bottom at the proximal end of the tubular container is pushed toward the distal end of said main body by said push rod;

(c) a driving piece having a first control opening therethrough receiving said push rod, said driving piece being both axially movable relative to said push rod and said main body and pivotally movable relative to said push rod and said main body;

(d) a driving means comprising:

(i) a second spring member urging said driving piece toward the proximal end of said main body and (ii) first means for moving said driving piece toward the distal end of said main body against the urging of said second spring member; and (e) a push rod control means comprising:

(i) a supporting plate projecting from said main body at least generally parallel to the axial direction of said push rod, said supporting plate having an aperture therethrough;

(ii) a control piece having a second control opening therethrough receiving said push rod, said control piece being received in said aperture in said supporting plate and being both axially movable relative to said push rod and said main body and pivotally movable relative to said push rod and said main body;

(iii) a releasing piece projecting from said driving piece toward said control piece; and (iv) a first spring member urging said control piece to pivot into an inclined position relative to the axis of said push rod, in which inclined position opposed portions of the periphery of said second control opening frictionally engage said push rod, which frictional engagement is maintained when said push rod and said control piece are moved axially relative to said main body until contact of said control piece with said releasing piece causes said control piece to pivot relative to said push rod so as to release the frictional engagement between said push rod and the opposed portions of the periphery of said second control opening.

9. An extrusion device as recited in claim 8 wherein:

(a) said push rod is circular in cross-section and (b) said control opening is circular in shape.

10. An extrusion device as recited in claim 8 wherein said first means comprise a lever manually pivotable about a fulcrum on said main body.

11. An extrusion device as recited in claim 8 wherein said first means comprise a lever pivotable about a fulcrum on said main body by electromagnetic means.

12. An extrusion device as recited in claim 8 wherein said first spring member is a coil spring which bears at one end against said main body and at the other end against said control piece.

13. An extrusion device as recited in claim 12 wherein said coil spring surrounds said push rod.

14. An extrusion device for extruding viscous material, said extrusion device comprising:

(a) a main body adapted to receive a tubular container containing viscous material and having a nozzle at the distal end and a slidable bottom at the proximal end;

(b) a push rod supported by said main body so as to be slidable in the axial direction of said main body, whereby, in use, viscous material in a tubular container received in said main body is extruded from the nozzle at the distal end of the tubular container when the slidable bottom at the proximal end of the tubular container is pushed toward the distal end of said main body by said push rod; and (c) a driving piece having a first control opening therethrough receiving said push rod, said driving piece being both axially movable relative to said push rod and said main body and pivotally movable relative to said push rod and said main body;

(d) driving means comprising:

(i) a second spring member urging said driving piece toward the proximal end of said main body and (ii) a lever having a first end and a second end, said lever being pivotable at a point intermediate its first and second ends about a fulcrum on said main body, said lever bearing against said driving piece such that pivotable movement of said lever about said fulcrum in a first direction causes said driving piece to move toward the distal end of said main body against the urging of said second spring member; and (e) a push rod control means comprising:

(i) a supporting plate projecting from said main body at least generally parallel to the axial direction of said push rod, said supporting plate having an aperture therethrough;

(ii) a control piece having a second control opening therethrough receiving said push rod, said control piece being received in said aperture in said supporting plate and being both axially movable relative to said push rod and said main body and pivotally movable relative to said push rod and said main body;

(iii) a wire connecting said control piece to said lever; and (iv) a first spring member urging said control piece to pivot into an inclined position relative to the axis of said push rod, in which inclined position opposed portions of the periphery of said control opening frictionally engage said push rod, which frictional engagement is maintained when said push rod and said control piece are moved axially relative to said main body until said wire becomes taut, causing said control piece to pivot relative to said push rod so as to release the frictional engagement between said push rod and the opposed portions of the periphery of said control opening.

15. An extrusion device as recited in claim 14 wherein:

(a) said push rod is circular in cross-section and (b) said control opening is circular in shape.

16. An extrusion device as recited in claim 14 wherein said first spring member is a coil spring which bears at one end against said main body and at the other end against said control piece.

17. An extrusion device as recited in claim 16 wherein said coil spring surrounds said push rod.

* * * * *